Figure 1:
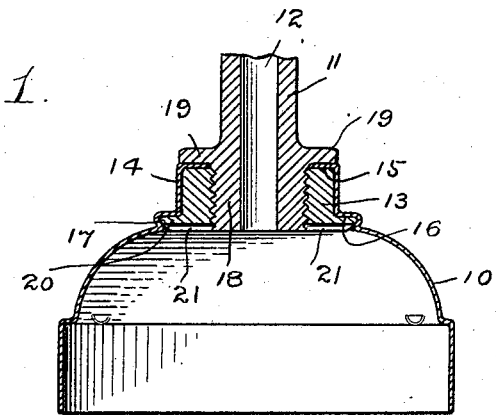

W. S. STAPLEY.
MEANS FOR ATTACHING ELECTRIC LAMP SOCKETS.
APPLICATION FILED OCT. 1, 1908.

917,372.

Patented Apr. 6, 1909.

Witnesses:
H. A. Lamb.
S. W. Atherton

Inventor
William S. Stapley
By Attorney
A. M. Wooster

UNITED STATES PATENT OFFICE.

WILLIAM S. STAPLEY, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

MEANS FOR ATTACHING ELECTRIC-LAMP SOCKETS.

No. 917,372.      Specification of Letters Patent.      Patented April 6, 1909.

Application filed October 1, 1908. Serial No. 455,607.

*To all whom it may concern:*

Be it known that I, WILLIAM S. STAPLEY, a citizen of the United States, residing at Bridgeport, county of Fairfield, State of Connecticut, have invented a new and useful Means for Attaching Electric-Lamp Sockets, of which the following is a specification.

This invention relates to electric lamp sockets and has for its object to provide a simple and inexpensive means for attaching the sockets to fixtures, it being especially important to avoid the use of screws and all external means of attachment and to provide attaching means which may be easily and quickly operated to attach or detach a socket and which will lock the socket securely in place.

With these and other objects in view I have devised the novel attaching means which I will now describe, referring to the accompanying drawing forming a part of this specification and using reference characters to indicate the several parts.

Figure 2:
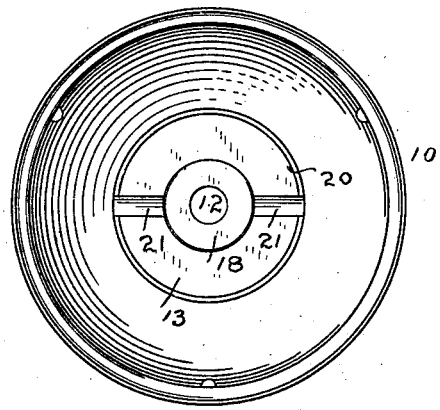

Figure 1 is a sectional view showing the cap of a socket shell, the arm of a fixture and my novel attaching means, as in use; and Fig. 2 is an inverted plan view corresponding with Fig. 1.

10 denotes the cap of a lamp socket, 11 a fixture shown as provided with a central opening 12 for the current wires (not shown) and 13 the locking nut.

I have shown the cap only of a lamp socket as the structure of the socket itself is wholly unimportant so far as the present invention is concerned. The cap is provided at its attaching end with a circular hub 14, above the hub with an inwardly turned flange 15, below the hub with an outwardly extending shoulder 16, and below the shoulder with an inwardly-turned bead 17 which is formed after the nut is in place, as will be more fully explained.

The fixture is provided at its end with an externally-threaded hub 18 and above the hub with a flange 19. The nut 13 is circular in form and of a size to fill hub 14 but is loose enough to turn freely therein. At the outer end of the nut is a flange 20 which is adapted to engage shoulder 16 on the hub of the cap. The face of the nut is provided with radial slots 21 for engagement by a suitable setting tool (not shown).

The assembling consists in placing the nut in hub 14 of the cap and then securing it in place by turning in bead 17 from the metal of the cap below the flange of the nut. It should be understood that while the nut is held securely in place by the bead it is left free to be rotated in the socket by means of a setting tool.

The operation will be readily understood from the drawing. The nut is placed in engagement with threaded hub 18 on the fixture and is then turned to place. Flange 15 of the cap is clamped between flange 19 on the fixture and the nut, and flange 20 of the nut is turned closely against shoulder 16 of the cap. I thus provide two strong points of support for the weight of the socket and the parts carried thereby, namely: the flange of the cap, which is clamped between the flange of the fixture and the nut and the shoulder of the cap which bears upon the flange of the nut, it being understood that the height of the nut above its flange is proportioned accurately to provide these two points of engagement and support.

Having thus described my invention I claim:

The combination with a fixture having an externally-threaded hub and a flange, of a cap having a hub with an inwardly-extending flange adapted to engage the flange of the fixture and an outwardly-extending shoulder and a nut adapted to engage the hub of the fixture and to clamp the flange of the hub of the cap between itself and the hub on the fixture and having an outwardly-extending flange adapted to engage the shoulder on the cap, said nut being retained in place by closing in the metal of the cap below the flange of the nut.

In testimony whereof I affix my signature, in presence of two witnesses.

WILLIAM S. STAPLEY.

Witnesses:
    AUKER S. LYHNE,
    ARTHUR H. MOORE.